Figure 1:
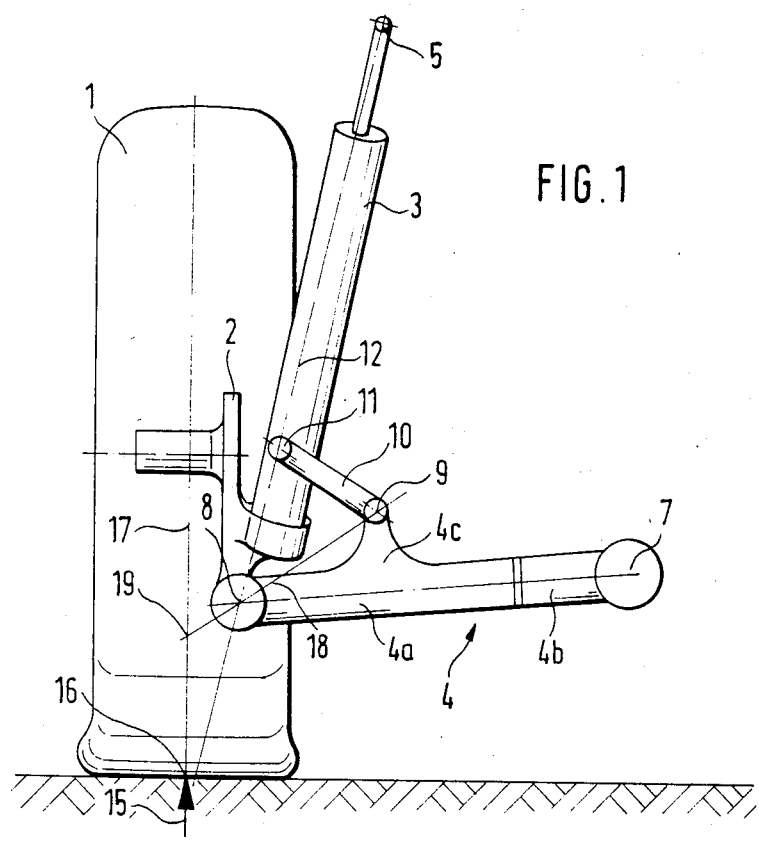

United States Patent [19]
Sautter

[11] Patent Number: 4,655,474
[45] Date of Patent: Apr. 7, 1987

[54] INDEPENDENT VEHICLE WHEEL SUSPENSION

[75] Inventor: Wolfgang Sautter, Gräfelfing, Fed. Rep. of Germany

[73] Assignee: Bayerische Motoren Werke Aktiengesellschaft, Fed. Rep. of Germany

[21] Appl. No.: 852,568

[22] Filed: Apr. 16, 1986

[30] Foreign Application Priority Data

Apr. 24, 1985 [DE] Fed. Rep. of Germany ....... 3514815

[51] Int. Cl.⁴ .............................................. B60G 3/00
[52] U.S. Cl. ..................................... 280/666; 280/696
[58] Field of Search ............... 280/664, 666, 668, 673, 280/675, 688, 690, 695, 696, 701

[56] References Cited

U.S. PATENT DOCUMENTS 4,202,563 5/1980 Tattermusch ....................... 280/675
4,377,298 3/1983 Finn et al. ........................... 280/696
4,556,238 12/1985 Matschinsky ...................... 280/673

FOREIGN PATENT DOCUMENTS 1190810 12/1965 Fed. Rep. of Germany .
1555319 10/1970 Fed. Rep. of Germany .
1455665 2/1971 Fed. Rep. of Germany .
2249971 4/1974 Fed. Rep. of Germany .
3139792 4/1983 Fed. Rep. of Germany ...... 280/701
3403464 8/1984 Fed. Rep. of Germany .
2007610 5/1979 United Kingdom .
2069947 9/1981 United Kingdom ................ 280/701

Primary Examiner—John J. Love
Assistant Examiner—Ross Weaver
Attorney, Agent, or Firm—Barnes & Thornburg

[57] ABSTRACT

An independent vehicle wheel suspension, especially for steered vehicle wheels of passenger motor vehicles, which includes a shock absorber strut and a support arm connected at the shock absorber strut by way of a support joint. The support arm is subdivided by way of a hinge joint into a section on the side of the wheel and into a section on the side of the body. Additionally, an intermediate guide member connects the support arm and shock absorber strut. A pivot axis between the universal joint of the intermediate guide member on the support arm side and the support joint intersects the line of action of a vertical force engaging at the point of contact of the wheel. The extension of the joint axis of the hinge joint also extends through this point of intersection. As a result of this construction the shock absorber strut 3 is to remain free of transverse forces.

14 Claims, 2 Drawing Figures

INDEPENDENT VEHICLE WHEEL SUSPENSION

The present invention relates to an independent vehicle wheel suspension, especially for steered vehicle wheels of passenger motor vehicles with a shock absorber strut that is connected by way of a support joint with a support arm extending essentially transversely to the vehicle longitudinal direction and pivotally connected at the vehicle body.

The DE-OS No. 22 49 971 discloses a wheel suspension of the aforementioned type, in which the support joint is constructed as rotary joint. The pivot axis extends essentially in the vehicle longitudinal direction and is at a distance to the line of action of a vertical force engaging at the contact point of the wheel. As a result thereof the vertical force produces a moment which causes transverse forces in the shock absorber strut. The consequence thereof is an increased friction between the sliding parts of the shock absorber which increases the break-away forces and impairs the spring comfort.

It is the object of the present invention to so further develop a wheel suspension of the aforementioned type that the shock absorber strut is far-reachingly kept free of such transverse forces.

The underlying problems are solved according to the present invention in that the support joint is constructed as universal joint, in that an intermediate guide member additionally connects the shock absorber strut with the support arm and is connected at least at the support arm by means of a universal joint, in that the line of connection between the universal joint of the intermediate guide member on the support arm side and the support joint intersects with its extension in a point of intersection the line of action of a vertical force acting in the point of contact of the wheel, and in that support arm is subdivided by a hinge joint into a section on the side of the wheel and into a section on the side of the body acted upon with the spring force, whereby the hinge axis is directed toward this point of intersection.

An ideal joint point of the pivotal connection between the shock absorber strut and the support arm results from the present invention on the line of action of the vertical force engaging in the point of contact of the wheel. The vehicle wheel seeks to tilt during occurrence of such a force about an axis which is formed between the universal joint on the side of the support arm and the support joint. Since this axis according to the present invention intersects the line of action of the vertical force, an undesired moment is prevented in the shock absorber strut.

According to the present invention the spring force which acts between the vehicle body and the wheel, acts upon the section of the support arm on the body side. The hinge joint transmits this force, it therefore acts in the joint axis. Since the joint axis is also directed toward the point of intersection between the line of action of the normal contact force of the wheel and the aforementioned pivot axis, no moment again occurs between the force pair of normal contact force of the wheel and spring force.

The spring force can be realized by a coil spring arranged between the section of the support arm on the side of the body and the vehicle body. However, it may also be constructed as torsion rod spring, by way of which the support arm is pivotally connected at the vehicle body. Finally, the section of the support arm on the side of the body may represent a leaf spring. In a particularly simple construction the support arm consists of a plastic material of any suitable known type which has spring properties by corresponding material selection. In this case the hinge axis may be formed by notches in the manner of film hinges.

According to a further feature of the present invention the component forming the intermediate guide member also consists of plastic material. It can then be constructed in one piece with the support arm under formation of a further hinge joint. The joint axis of this hinge joint intersects in this case, as the aforementioned pivot axis, the line of action of the vertical force.

In order to obtain a load-free shock absorber strut, the pivot joint between wheel carrier and support arm would have to be displaced up to into the wheel center with the prior art construction. Only in this position the vertical force would not produce a moment in the shock absorber strut. However, as a rule, no space is available for such an arrangement of the pivot joint because the space is required by parts of the brake, etc.

In practice, it will not always be possible to let the pivot axis intersect precisely with the line of action of the vertical force. The point of intersection will possibly be located in close proximity thereof. In this case, of course, a moment occurs again which stresses the shock absorber strut. However, if the moment remains sufficiently small, it can be neglected in view of the advantage achieved with the present invention to provide the support joint in a location which is not required by any other vehicle chassis or suspension parts.

If the pivot axis intersects the line of action of the vertical force in proximity of the road surface, the support arm can absorb longitudinal and cross forces in a particularly advantageous manner. Such a layout of the pivot axis can be achieved in a simple manner by the inventive concept in that the joint of the intermediate guide member on the support arm side is arranged higher, as viewed in the driving direction, than the support joint.

The wheel suspension according to the present invention is suited in particular for steered vehicle wheels without precluding thereby its application for non-steered wheels. In the case of the application with a steered wheel the intermediate guide member also includes a universal joint on the side of the shock absorber strut, through the joint center point of which must extend the steering axis of the vehicle wheel.

Figure 2:
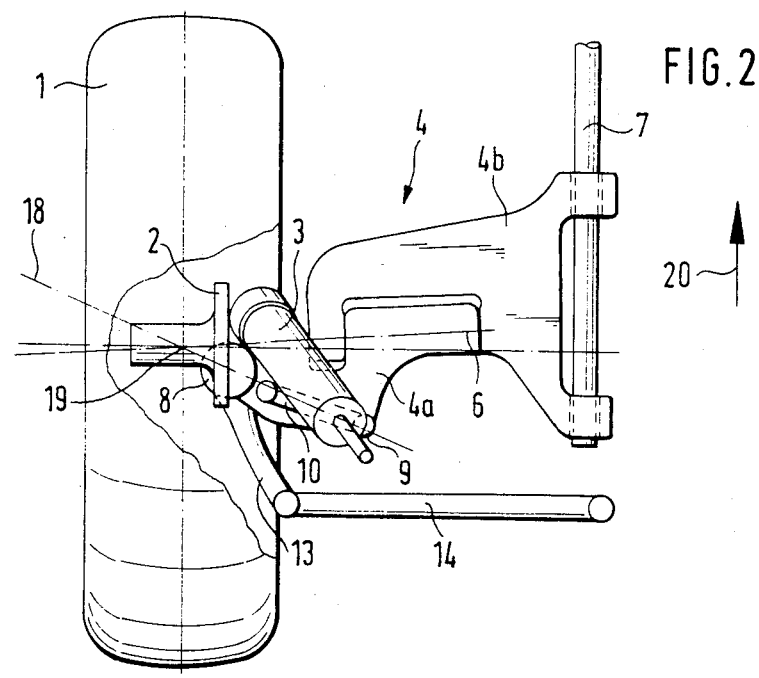

These and other objects, features and advantages of the present invention will become more apparent from the following description when taken in connection with the accompanying drawing which shows, for purposes of illustration only, one embodiment in accordance with the present invention, and wherein:

FIG. 1 is a schematic elevational view of a wheel suspension in accordance with the present invention, as viewed in the driving direction; and FIG. 2 is a plan view on the wheel suspension of FIG. 1

Referring now to the drawing wherein like reference numerals are used throughout the two views to designate like parts, the independent wheel suspension illustrated in the drawing is to be provided for a steered vehicle wheel of a passenger motor vehicle. For the most part those parts are thereby omitted in the two figures which are not necessary for an understanding of the present invention.

A vehicle wheel 1 is supported on a wheel carrier 2. The wheel carrier 2 is pivotally connected at the vehicle body (not shown) or at structural parts secured thereon, such as an auxiliary frame etc., by way of a shock absorber strut 3 and a support arm generally designated by reference numeral 4. The shock absorber strut 3 is essentially vertically directed and is rigidly connected with the wheel carrier 2. With its other end the shock absorber strut 3 is supported in a joint bearing 5 of the vehicle body.

According to FIG. 2 the support arm 4 extends essentially transversely to the vehicle longitudinal direction. The driving direction is indicated by reference numeral 20. A hinge joint with the hinge axis 6 subdivides the support arm 4 into a section 4a on the side of the wheel carrier and into a section 4b on the side of the body. With its section 4b on the side of the body the support arm is pivotally connected at the vehicle body by way of a torsion rod spring 7. The spring force which acts between the vehicle wheel 1 and the vehicle body is therefore produced by this torsion rod spring 7. At its section 4a on the side of the wheel the support arm 4 includes a universal joint 8, by way of which it is pivotally connected at the wheel carrier 2 and therewith at the shock absorber strut 3. Finally, the section 4a on the wheel side forms a protuberance-shaped extension 4c, at which an intermediate guide member 10 is secured by way of a universal joint 9. The other end of the intermediate guide member 10 is also pivotally retained at the shock absorber strut 3 by way of a universal joint 11. The universal joint 11 is thereby located on the steering axis of the vehicle 1 which in FIG. 1 is designated by reference numeral 12 and which results from the connection between the joint bearing 5 and the support joint 8.

Finally and for the sake of completeness, FIG. 2 additionally illustrates a steering lever 13 at which engages a tie-rod 14 leading to a steering gear (not shown).

According to FIG. 1 a vertical force 15 engages in the point of the wheel contact 16. This vertical force 15 is produced by the weight of the vehicle and can increase or decrease during the driving operation by the unevenness of the road surface. The line of action of the vertical force 15 is designated by reference numeral 17; it extends vertically upwardly.

As can now be seen from FIG. 1, the connecting line 18 between the universal joint 9 on the support arm side of the intermediate guide member 10 and the support joint 8 intersects the line of action 17 in the point of intersection 19. This point of intersection 19 can also be seen in FIG. 2; therebeyond FIG. 2 illustrates that the axis 6 of the hinge joint is also directed toward this point of intersection 19 and in its extension therefore extends through the same.

As a result of this construction the vertical force 15 is not able to rotate the vehicle wheel 1 about the axis, represented by the connecting line 18. Additionally, it is assured by the location of the hinge axis that no offset occurs between the line of action 17 of the vertical force 15 and the spring force acting on the section 4b of the support arm 4 on the side of the body which might initiate an undesired moment.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An independent vehicle wheel suspension, comprising shock absorber strut means, support arm means extending essentially transversely to the vehicle longitudinal axis and pivotally connected at a relatively fixed vehicle part, support joint means operatively connecting the shock absorber strut means with the support arm means, the support arm means being operable to transmit a spring force acting between the relatively fixed vehicle part and the vehicle wheel, the support joint means being constructed as universal joint, an intermediate guide member additionally operatively connecting the shock absorber strut means with the support arm means, said intermediate guide member being operatively connected by means of a universal joint means at least at the support arm means, the line of connection between the universal joint means of the intermediate guide member on the side of the support arm means and the support joint means intersecting with its extension in a point of intersection the line of action of a vertical force acting at the point of contact of the wheel, and the support arm means being subdivided by a hinge joint into a section on the wheel side and into a section on the side of the relatively fixed part and acted upon with spring force, the hinge axis being also directed toward said point of intersection.

2. A wheel suspension according to claim 1, wherein the wheel suspension is for steered vehicle wheels of passenger motor vehicles.

3. A wheel suspension according to claim 1, wherein the relatively fixed part is a part of the body.

4. A wheel suspension according to claim 1, wherein the intermediate member also includes a universal joint means on the side of the shock absorber strut means, the center point of the last-mentioned universal joint means being located substantially on the line of connection between a joint bearing of the shock absorber strut means at the relatively fixed part and the support joint means.

5. A wheel suspension according to claim 4, wherein the universal joint means of the intermediate guide member on the support arm side is in a higher position, as viewed in the driving direction, compared to the support joint means.

6. A wheel suspension according to claim 5, wherein the support arm means consists of a plastic material having spring properties.

7. A wheel suspension according to claim 6, wherein the hinge joint is formed by notches in the top and bottom side of the support arm means in the manner of a film hinge.

8. A wheel suspension according to claim 7, wherein the intermediate guide member is made in one piece with the support arm means and includes a further hinge joint whose hinge axis forms the pivot axis substantially corresponding to said connecting line.

9. A wheel suspension according to claim 8, wherein the section of the support arm means on the side of the relatively fixed part is secured at the relatively fixed part by way of a pivot joint with a torsion rod spring serving as joint axis thereof.

10. A wheel suspension according to claim 1, wherein the universal joint means of the intermediate guide member on the support arm side is in a higher position, as viewed in the driving direction, compared to the support joint means.

11. A wheel suspension according to claim 1, wherein the support arm means consists of a plastic material having spring properties.

12. A wheel suspension according to claim 11, wherein the hinge joint is formed by notches in the top and bottom side of the support arm means in the manner of a film hinge.

13. A wheel suspension according to claim 12, wherein the intermediate guide member is made in one piece with the support arm means and includes a further hinge joint whose hinge axis forms the pivot axis substantially corresponding to said connecting line.

14. A wheel suspension according to claim 1, wherein the section of the support arm means on the side of the relatively fixed part is secured at the relatively fixed part by way of a pivot joint with a torsion rod spring serving as joint axis thereof.

* * * * *